United States Patent [19]

Groben et al.

[11] 4,160,038

[45] Jul. 3, 1979

[54] LACTIC ACID FERMENTATE FLAVORED PET FOOD

[75] Inventors: Richard L. Groben; Alfred J. Gryczka; Alfred A. Franklin, all of Sarasota, Fla.

[73] Assignee: Microlife Technics, Inc., Sarasota, Fla.

[21] Appl. No.: 712,492

[22] Filed: Aug. 9, 1976

[51] Int. Cl.$^2$ .......................... A23K 1/10; A23K 1/00
[52] U.S. Cl. ........................................ 426/53; 426/49; 426/56; 426/335; 426/533; 426/623; 426/630; 426/805
[58] Field of Search ................. 426/623, 630, 20, 805, 426/62, 56, 49, 52, 533, 53, 74, 54, 335, 532; 195/96

[56] References Cited

U.S. PATENT DOCUMENTS

| | | | |
|---|---|---|---|
| 3,202,514 | 8/1965 | Burgess et al. | 426/74 |
| 3,404,984 | 10/1968 | Olsen | 426/533 |
| 3,561,977 | 2/1971 | Rothchild et al. | 426/59 |
| 4,041,181 | 8/1977 | Burrows et al. | 426/55 |

*Primary Examiner*—R. B. Penland
*Attorney, Agent, or Firm*—Ian C. McLeod

[57] ABSTRACT

A food for carnivorous lower animals which is fermented by certain lactic acid producing bacteria that produce a desirable flavor or which has an added flavoring from an edible material fermentate of lactic acid producing bacteria is described. The pet food has a pH of from about 3 to less than 6 and is particularly palatable to dogs.

10 Claims, No Drawings

LACTIC ACID FERMENTATE FLAVORED PET FOOD

DESCRIPTION OF THE INVENTION

The present invention relates to a novel food for carnivorous lower animals, particularly dogs. In particular, the present invention relates to a food which includes a flavor from an edible material fermentate of lactic acid producing bacteria and has a pH from about 3 to less than 6.

PRIOR ART

The prior art foods for carnivorous lower animals, particularly pets such as cats and dogs, is particularly described by U.S. Pat. No. 3,202,514, and include pet foods composed of meaty protein, vegetable protein or mixtures thereof. The patent disclosure is particularly directed to a soft, moist pet food having a pH between 6.0 to 8.0 which is palatable to dogs and which can be packaged using non-hermetic sealing and under non-sterile conditions in moisture retaining packages. The pet food is of the soft, deformable, shape retaining type including a hydrated matrix of meaty protein and vegetable protein as well as an antimycotic agent. A low pH is indicated by the patent disclosure as not being particularly palatable to dogs.

In general, a low or acid pH in pet food produces a flavor which the dogs do not like. The addition of acids such as lactic and acetic acid as chemicals destroys the palatability, but would be desirable since they are bacteriostatic to certain bacteria. Thus, the moist pet foods which are packaged at pH 6.0 to 8.0 under non-sterile and non-hermetic conditions have used very large concentrations of at least about 15% by weight (preferably 15% to 35% by weight) of low molecular weight solids principally sugars which are bacteriostatic in the presence of the moisture in order to compensate for the low acidity. In recent times sugars have become relatively expensive.

Usually all meat type pet foods are well accepted by dogs but are relatively expensive. The cheaper vegetables or cereal types are not as well accepted. The soft, moist dog foods are readily eaten by dogs and contain between about 25 to 40% by weight of vegetable protein and preferably between about 25 to 35% by weight of meat protein.

OBJECTS

It is therefore an object of the present invention to provide a food for carnivorous lower animals, particularly dogs, with a pH from about 3 to less than 6 which is particularly palatable to dogs. It is further an object of the present invention to reduce the levels of sugars needed for bacteriostatic purposes in soft, moist pet foods which are packaged under non-sterile conditions. Further still, it is an object of the present invention to provide meat or cereal type pet foods which are particularly palatable to dogs. These and other objects will become increasingly apparent by reference to the following description.

GENERAL DESCRIPTION

The present invention relates to a food for carnivorous lower animals including meaty protein, vegetable protein or mixtures thereof and including a flavoring from an edible material fermentate of lactic acid producing bacteria in an amount sufficient to produce a pH between from about 3 to less than 6 and which is palatable to dogs. The pet food is adapted to be fed to all kinds of carnivorous animals, but is particularly adapted to be fed to dogs which as a class have a highly sensitive sense of taste.

Lactic acid producing bacteria are well known and usually include the families Lactobacillaceae and Streptococcaceae. Also there are species of Micrococcus which generate lactic acid. In general these bacteria assimilate low molecular weight sugars such as glucose, lactose, maltose and the like to produce by fermentation lactic acid as well as other acids such as propionic or acetic acid. *L. delbrueckii, L. Leichmannii, L. jensenii, L. lactis, L. bulgaricus, L. helveticus, L, acidophilus, L. salivarius, L. casei, L. casei* subsp. *tolerans, L. casei* subsp. *pseudoplantarum, L. xylosus, L. plantarum, L. curvatus, L. coryniformis* subsp. *coryniformis, L. coryniformis* subsp. *torquens, L. homohiochii, L. fermentum. L. cellobiosus, L. brevis, L. buchneri, L. viridescens, L. coprophilus, L. hilgardii, L. trichodes, L. fructivorans, L. desidiosus, L. heterohiochii, Pediococcus cerevisiae, P. halophilus, P. urinae-equi, P. acidilactici, P. pentosaceus, Streptococcus lactis* (especially nisin producing strains), *Streptococcus cremoris, Streptococcus lactis* subspecies *diacetilactis. Micrococcus sp.* NRRL-B-8048 and 8049 can also be used.

The bacteria which are useful for the present invention include any of those described in the prior art which are lactic acid producing bacteria and which produce flavorful by-products, along with the lactic acid. Included as lactic acid producing bacteria are those for: meat, such as taught in U.S. Pat. No. 3,561,977; pickles, such as in U.S. Pat. No. 3,410,755; sour dough bread such as in U.S. Pat. No. 3,404,984 and dairy products such as in U.S. Pat. No. 3,420,742, as well as mixtures of these bacteria. Such bacteria are commercially available in concentrated form containing above about $10^9$ cells per ml. Preferably they are frozen and contain growth medium and a freezing stabilizing agent in order to be immediately viable. The bacteria are preferably continuously neutralized to a pH between about 6.0 to 7.0 as they are grown prior to concentration and use to prevent acid damage of the cells. Known freezing stabilizing agents include polyhydric alcohols, such as glycerol, as well as skim milk. They are also available in concentrated lyophilized powder form but are much slower acting.

In general, the products of these prior art patents are intended for human consumption and are in a food form adapted for that purpose. It has not occurred to those skilled in the art that lactic acid bacteria flavors could be adapted to foods for carnivorous animals, particularly dogs, because of the high acidity which is associated with these flavors. Unexpectedly, it has been found that high acidity lactic acid bacteria fermented flavored foods are palatable to dogs.

The flavor can be provided by fermenting an ingredient and blending it with all of the ingredients in the pet food or by fermenting all ingredients in the pet food. In some instances it is easier to blend a fermented flavoring ingredient such as a fermented cereal or a fermented meat.

The techniques of fermentation of food additives or food products are very well known to the prior art. In general the bacteria are introduced to produce a level of about $10^5$ cells per gram of the fermentation mixture along with sufficient water and necessary nutrients to promote growth. The specific nutrients and fermentation temperatures are determined by the particular species or even the particular strain of bacteria selected.

SPECIFIC DESCRIPTION

The following Examples illustrate the present invention. Example I illustrates how a finished soft, moist pet food is fermented with lactic acid producing bacteria.

EXAMPLE I

The bacterium used in this Example was a concentrate of *Pediococcus cerevisiae* (NRRL-B-5627) which was grown and concentrated as described in U.S. Pat. No. 3,561,977. The bacterium was supplied in a sealed container in frozen form (minus 5° C. or below) as a concentrate containing about $10^{10}$ cells per ml, nutrient medium and glycerol as a freezing stabilizing agent with a pH of about 6.0. The concentrate was thawed by placing the sealed container of concentrate in warm chlorinated water (26° C. to 32° C.; 78° to 89.6° F.) for about 10 minutes.

A soft, moist dog food prepared according to U.S. Pat. No. 3,202,514 was fermented with the *Pediococcus cerevisiae* concentrate. This product as marketed has a very high bacteriostatic chemical content, principally sugar solids. It was found that a direct fermentation of this product without any growth additives was not effective probably because of the bacteriostatic agents in this product. In order to overcome this problem, yeast extract was added at low weight levels, since this nutrient is specifically utilized by *Pediococcus cerevisiae*. In order to monitor the fermentation, the pH was determined as a function of time. Water was added in a sufficient amount to provide a homogeneous moist mixture.

The results with added yeast extract to overcome the effects of the bacteriostatic salts are shown in Table I.

TABLE I

| ml Concentrate | ml of Water | Percent by Weight Yeast Extract | Hours time | pH |
|---|---|---|---|---|
| 0.6 | 500 | 2% | 6 | 4.70 |
|  |  |  | 21 | 4.35 |
| 0.6 | 450 | 1% | 36 | 4.50 |
| 0.6 | 450 | 2% | 36 | 4.30 |

As can be seen from Table I, the presence of yeast extract produces a significant lowering of the pH.

The products of Table I after 21 hours and 36 hours fermentation were fed to three house pet dogs and they ate it with obvious relish.

EXAMPLE II

In this Example, the meat was fermented prior to being pasteurized according to the teachings of U.S. Pat. No. 3,202,514. The meat mixture was fermented for various lengths of time in order to produce a pH between about 4.0 to 4.1. In one instance, the pH was adjusted to 6.75 before further processing.

Four (4) batches of semi-moist pet food were prepared for preference testing by dogs. Each batch consisted of the following four components: meat, water and corn syrup, propylene glycol and a vegetable protein mixture consisting of soy flour, sucrose, potassium sorbate, seasoning and red dye. Each component was divided into four aliquots.

The method of preparation of the four batches of pet food was as follows:

1. Prepare each batch in a suitable mixer by adding 2.72 kg (3 lb-12 oz) meat to 0.82 kg (1 lb-2 oz) water and corn syrup. Mix thoroughly.
2. Prepare a concentrate of *Pediococcus cerevisiae* (NRRL-B-5627) as described in Example I and add at rate of 1.7 ml/1.36 kg to batches 1, 2 and 3. To control batch 4, add no culture and immediately proceed to steps 4, 5, 6, 7 and 8 below.
3. Incubate batch No. 1 and No. 2 at 42.2°-43.3° C. (108°-110° F.) for 22.5 hrs. and batch No. 3 for 9 hrs. after reaching 40.6° C. (105° F.) (total time 15 hrs.). After incubation the pH of batch No. 2 was adjusted to 6.75 by adding 50% by weight NaOH solution.
4. Add 0.41 kg (9 oz) propylene glycol to each batch.
5. Transfer the batches to a suitable steam jacketed kettle and heat to 87.8° C. (190° F.).
6. Add 4.3 kg (5 lb-15 oz) of a vegetable protein mixture consisting of soy flour, sucrose, potassium sorbate, seasoning and red dye. Stir continuously with a wooden paddle to prevent excessive local heating.
7. Heat to 87.8° C. (190° F.) and allow to cool.
8. Extrude into hamburger-like mass for feeding to dogs. The meat represented forty-four percent (44%) by weight of the pet food.

The fermentation data is set forth in Table II.

TABLE II

| Batch Number | Initial pH | Incubation Time (hr.) | Product Temp.°F. | pH after fermentation | Final pH after addition of vegetable protein mixture |
|---|---|---|---|---|---|
| 1 | 7.65 | 22.5 | 108°-110° | 4.1 | 5.30 |
| 2 | 7.65 | 22.5 | 108°-110° | *4.1 | 5.81 |
| 3 | 7.65 | 15.0 | 105°-110° | 4.0 | 5.28 |
| 4 | 7.65 | 0 | — | 7.65 | 5.80 |

*Adjusted to 6.75 prior to adding propylene glycol.

The pet food products were fed to a trained dog taste panel which had a choice between the fermented product and an unfermented control. The dogs preferred the fermented products.

EXAMPLE III

Another route to flavoring a dog food is by fermenting various grains in the form of a meal or a flour and mixing with the dog food in the desired proportions. In this procedure, 100 grams of the grain flours and meal were mixed with 400 ml of water and 1 ml of the concentrate containing about $10^{10}$ cells per ml and fermented at 37° C. The results are shown in Table III. It can be seen from Table III that, for the particular bacteria used, some meals and flours fermented and some did not.

TABLE III

| Flour | Initial pH | Culture | 24 hr-pH |
|---|---|---|---|
| wheat feed flour (2nd clear) | 5.2 | L.p. | 3.55 |
|  |  | P.c. | 4.30 |
|  |  | L.l. | 3.70 |
| Soy flour | 6.45 | L.p. | 4.5 |
|  |  | P.c. | 5.7 |
|  |  | L.l. | 4.15 |
| Meat & bone meal | 6.15 | L.p. | 5.55 |
|  |  | P.c. | 5.6 |
|  |  | L.l. | 5.85 |
| Oat Flour #65 | 6.2 | L.p. | 4.2 |
|  |  | P.c. | 4.1 |
|  |  | L.l. | 4.35 |

TABLE III-continued

| Flour | Initial pH | Culture* | 24 hr-pH |
|---|---|---|---|
| Corn gluten meal | 4.25 | L.p. | 4.15 |
|  |  | P.c. | 4.3 |
|  |  | L.l. | 4.15 |
| Poultry by-product | 5.45 | L.p. | 5.45 |
|  |  | P.c. | 5.35 |
|  |  | L.l. | 5.45 |

*(L.p. is *Lactobacillus plantarum* NRRL-B-5632; P.c. is *Pediococcus cerevisiae* NRRL-B-5627 and L.l. is *Lactobacillus lactis* NRRL-B-5628.

As can be seen from Table III, wheat feed flour, oat flour and, except with *Pediococcus cerevisiae*, special soy flour were fermented successfully. From this group, the wheat flour was determined to produce a good smelling product.

The procedure was repeated by mixing 10 pounds of wheat flour in 5 gallons of water, dividing into 4 liter aliquots, which were inoculated with L.p., P.c. or L.l.. The results are shown in Table IV where the initial pH of the flour was 6.15 and the incubation at 40° C.

TABLE IV

|  | ml of Culture | pH after 24 hours | Comment |
|---|---|---|---|
| *Lactobacillus plantarum* | 10 | 4.2 | "off" odor |
|  | 1 | 4.35 | "off" odor |
| *Pediococcus cerevisiae* | 10 | 3.95 | clean acid odor |
|  | 1 | 4.40 | "off" odor |
| *Lactobacillus lactis* | 10 | 4.1 | clean acid odor |
|  | 1 | 4.25 | "off" odor |

Those fermented products of *Pediococcus cerevisiae* and *Lactobacillus lactis* which had a clean acid odor were incubated at 45° C. for 96 hours to produce a final pH of 3.5.

These fermented products were mixed with a dry cereal type dog food (Gaines ® Meal) and in a weight ratio of 1 to 20 to produce a final product pH of 5.35. The products were fed to dogs and it was determined that the dogs liked the fermented flavor pet food.

The procedure was repeated with soy flour at an initial pH of 6.5 in 2 liter aliquots and 10 ml of culture.

|  | Fermentation Temperature | pH after 24 hours | Comment |
|---|---|---|---|
| *Lactobacillus plantarum* | 35° C. | 4.80 | "off" odor |
| *Pediococcus cerevisiae* | 45° C. | 4.65 | clean acid odor |
| *Lactobacillus lactis* | 45° C. | 4.50 | clean acid odor |

The fermented products with a clean acid odor were mixed with a dry type dog food and in a weight ratio of 1 to 20 to produce a final product pH of 5.65. The products were fed to dogs and it was determined that the dogs liked the fermented flavor pet food.

EXAMPLE IV

A high protein wheat flour, fermented by a neutralized concentrate of *Lactobacillus plantarum* was dried to produce a fermented flour, by spray drying or by drying and milling. This dried product was mixed with a soft, moist dog food (Gaines-burgers$_{TM}$) obtained from a local supermarket in a weight ratio of 4 to 6 respectively to produce a final product pH of 4.5. The resulting fermented flavor product was fed to several house pet dogs which ate and liked it.

EXAMPLE V

A cereal type dog food (Gaines$_{TM}$Meal) was ground to a powder in a blender and mixed with the fermented flour as described in Example IV. The flour was blended with the dry dog food in various weight ratios as follows: 1 part flour to 30 parts dry dog food to produce a final product pH of 5.4; 1 part flour to 20 parts dry dog food to produce a final product pH of 5.2; and 1 part flour to 10 parts dry dog food to produce a final product pH of 4.8. The products were fed to house pet dogs and cats who ate them with apparent relish.

As can be seen from the foregoing Examples, there are a number of methods for providing the fermented flavor in the dog food. In terms of the flavor produced, the results depend more on the bacterium used than the method of fermentation, since each lactic acid producing bacterium has a distinct fermentate flavor. For this reason *Pediococcus cerevisiae; Lactobacillus plantarum* and *Lactobacillus lactis* are preferred. The products like Examples I to IV in a cat food formulation were fed to cats and it was determined that they liked the products. Also the products are believed to have at least an equivalent and in some instances better shelf-life in comparison to equivalent prior art products.

We claim:

1. A semi moist pet food composition for carnivorous lower animals comprising a deformable shape retaining hydrated matrix of meaty protein and vegetable protein with a moisture content between about 15 and 30% by weight which matrix is in admixture with bacteriostatic low molecular weight solids and an effective level of an antimycotic agent to prevent mold formation said composition packagable under non-sterile conditions and further comprising a flavoring from an edible material fermentate of lactic acid producing bacteria in an amount sufficient to produce a pH from about 3 to less than 6 which flavored food is palatable to dogs and flavor stable, wherein the edible material fermentate is prepared by growing the bacteria in the presence of a meaty protein, vegetable protein or mixture thereof until the pH from lactic acid and the flavoring is produced.

2. The composition of claim 1 wherein the edible material fermentate is produced by bacteria which are selected from *Pediococcus cerevisiae*, *Lactobacillus lactis*, *Lactobacillus plantarum* and nisin producing strains of *Streptococcus lactis*.

3. The composition of claim 1 wherein the flavoring is provided by a cereal flour or meal which has been fermented and mixed with the pet food.

4. The composition of claim 1 wherein the flavoring is provided by a fermented mixture of the meaty protein as the edible material.

5. The composition of claim 1 wherein the flavoring is provided by a lactic acid producing *Pediococcus cerevisiae* fermented mixture of the meaty protein, vegetable material, and a growth promoting agent.

6. The composition of claim 5 wherein a yeast extract is added as growth promoting agent.

7. The food of claim 1 which is packaged in moisture proof packs, non-hermetically and without sterilization.

8. The composition of claim 1 including the fermentate of the edible material and containing non-bacteriostatic levels of low molecular weight solids.

9. The composition of claim 8 wherein low molecular weight sugars are present in an amount of less than about 15% by weight.

10. The composition of claim 1 wherein the meaty protein is between 25 to 35% by weight and the vegetable protein is 25 to 40% by weight.